(12) United States Patent
Moen et al.

(10) Patent No.: US 7,687,091 B2
(45) Date of Patent: Mar. 30, 2010

(54) BACTERIAL HYDROLYSTATE

(75) Inventors: Einar Moen, Stavanger (NO); Henrik Eriksen, Nyborg (DK); Jan Larsen, Tommerup (DK)

(73) Assignee: Statoil ASA, Stavanger (NO)

( * ) Notice: Subject to any disclaimer, the term of this patent is extended or adjusted under 35 U.S.C. 154(b) by 121 days.

(21) Appl. No.: 10/504,464

(22) PCT Filed: Feb. 12, 2003

(86) PCT No.: PCT/GB03/00610

§ 371 (c)(1),
(2), (4) Date: Feb. 4, 2005

(87) PCT Pub. No.: WO03/068002

PCT Pub. Date: Aug. 21, 2003

(65) Prior Publication Data

US 2005/0124053 A1    Jun. 9, 2005

Related U.S. Application Data

(60) Provisional application No. 60/356,734, filed on Feb. 15, 2002.

(30) Foreign Application Priority Data

Feb. 12, 2002    (GB) ................................ 0203306.6

(51) Int. Cl.
*A23K 3/00*    (2006.01)
(52) U.S. Cl. ......................................... 426/53; 435/170
(58) Field of Classification Search ....................... None
See application file for complete search history.

(56) References Cited

FOREIGN PATENT DOCUMENTS

| FR | 2 311 091 | 12/1976 |
|---|---|---|
| GB | 933 826 | 8/1963 |
| WO | WO 01/60974 | 8/2001 |

OTHER PUBLICATIONS

The term "hydrolysis", Merriam-Webster Online Dictionary, at the web: http://www.m-w.com, p. 1.*
Drozd J.W. et al. An in situ assessment of the specific lysis rate in continuous cultures of Methylococcus sp. (NCIB 11083) grown on methane, FEMS Microbiology Letters, 1978, 4: 311-314, entire document.*
"Degrading Nucleic Acids to Produce Nucleotide Flavor Enhancers by Means of Double Enzymatic Method—A Deep-processed Yeast Product of High Added Value", *Sugarcane and Canesugar*, 3:32-36 (2000).
Starostina et al, *Applied Biochemistry and Microbiology*, 29(4):432-437 (1994).
Chetina et al, *Prikladnaya Biokhimiya I Mikrobiologiya*, 59(2):648-652 (1984).
Gorkina et al, *Biokhimiya*, 59(2):288-295 (1994).
Larsen et al, *Applied Microbiology and Biotechnology*, 45:137-140 (1996).
Skrede et al, *Amimal Feed Science and Technology*, 76(1/2):103-116 (1998).
Overland et al, *Animal Science*, 51:97-106 (2001).
Linton et al, *Society for Microbiology*, 101(2):219-226 (1977).
Middleberg et al, *Biotechnology Advances*, 13(3):491-551 (1995).
Babusenko et al, *Prikladnaya Biokhimiya I Mikrobiologiya*, 28(5):752-759 (1992).
Starostina et al, *Prikladnaya Biokhimiya I Mikrobiologiya*, 27(4):546-553 (1991).
Hanson et al, *Microbiological Reviews*, 60(2):439-471 (1996).
Bothe et al, *Appl. Microbiol.. Biotechnol.*, 59:33-39 (2002).
Product Brochure, "BioProtein: A New High Quality Single Cell Protein Based on Natural Gas" (1998).
"Unassailable Health-Promoting Function of the Nucleic Acid Nutraceuticals", *Chinafood*, 8:5-6 (2001).

* cited by examiner

*Primary Examiner*—Sandra Saucier
*Assistant Examiner*—Satyendra K Singh
(74) *Attorney, Agent, or Firm*—Sughrue Mion, PLLC

(57) ABSTRACT

A method for producing a feedstuff or feedstuff component, e.g. a palatability-enhancing agent, said method comprising subjecting a microbial culture which comprises a methanotrophic bacterium to enzymatic hydrolysis.

19 Claims, 1 Drawing Sheet

BACTERIAL HYDROLYSTATE

CROSS-REFERENCE TO RELATED APPLICATION

Figure 1:
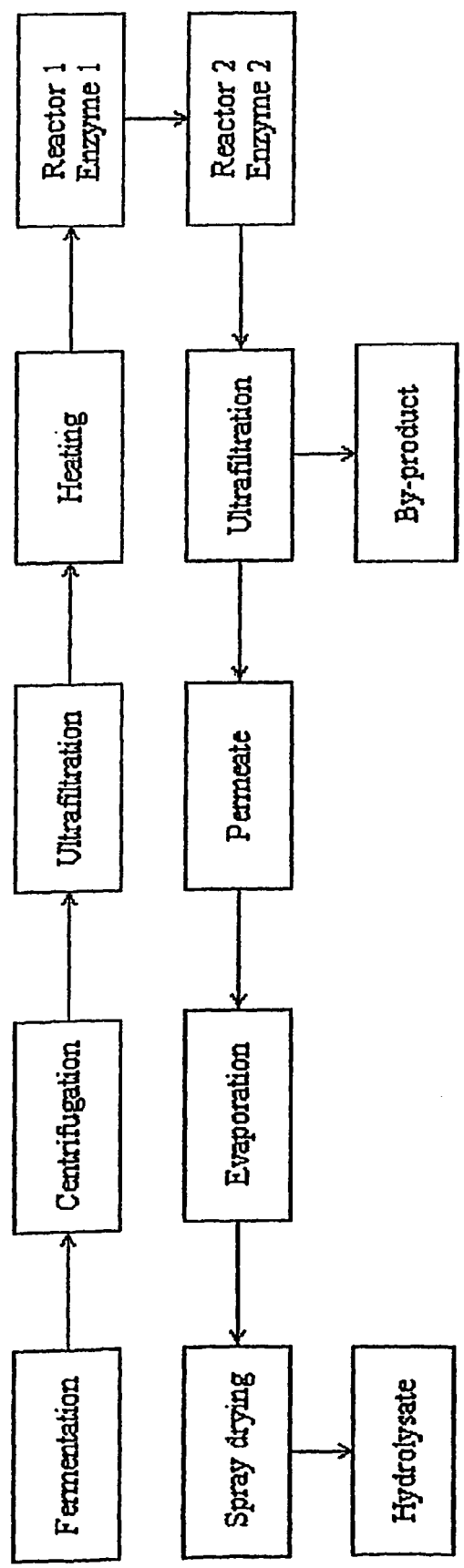

This application is a 371 of PCT/GB03/00610, filed Feb. 12, 2003, and claims benefit under 35 U.S.C. 119 to U.S. Provisional Application No. 60/356,734, filed Feb. 15, 2002; the disclosure of each of which is incorporated herein by reference.

The present invention relates to a process for the production of a palatability-enhancing hydrolysate from a bacterial biomass, in particular from a bacterial culture comprising a methanotrophic bacterium. This product finds particular use as a nutrient or as a flavour-enhancing agent in both human and animal foods as a replacement for traditional yeast derivatives.

Recently, much attention has been directed toward the development of new sources of protein which may be incorporated into foods for human and/or animal consumption. A number of different protein-containing materials have been proposed as substitutes for more traditional sources of protein, such as fish meal, soya products and blood plasma, in human foods and as animal feeds. These materials include protein-containing microorganisms (also referred to herein as "single-cell proteins") such as fungi, yeasts and bacteria.

Single-cell protein materials can be used directly in foods, e.g. as a spray dried product, or the biomass may be further processed, e.g. using techniques such as homogenization and/or separation, before use. WO 01/60974, for example, describes the production of a homogenized derivative of a bacterial biomass having excellent functional properties and which may be used in the preparation of various food products, for example as a gelling agent or emulsifier.

Today, the most widely used single-cell proteins are those derived from fungi or yeast. Yeast, for example, is well known for use in the brewing, wine-making and baking industries. Various processed derivatives of yeast are also known for use in the preparation of foodstuffs. For example, autolysis of yeast results in a variety of cellular components known for use as flavourings or seasonings in food products, e.g. in the preparation of sauces, gravies, etc. However, relatively large quantities of yeast autolysates are generally required to obtain the desired taste enhancement effects. Furthermore, autolysis of yeast is generally slow and it can take several days to achieve a suitable degree of digestion. Additives which act as autolysis initiators or stimulators, e.g. thiol agents, are therefore generally required to accelerate the autolysis process. This increases the cost of commercial production of yeast autolysates.

A continuing need exists for alternative materials which are capable of increasing the palatability of human and animal food products, especially materials which can be produced in large quantities and at relatively low cost. A particular need exists for new materials which can act as flavour enhancers.

Surprisingly, we have now found that the enzymatic hydrolysis of a methanotrophic bacterium-containing biomass has the effect of producing effective palatability enhancing components, especially flavour components, which are also useful as nutrients, i.e. feedstuffs or feedstuff components.

Thus, according to one aspect, the present invention provides a process for producing a feedstuff or feedstuff component, e.g. a palatability-enhancing agent, said method comprising subjecting a microbial culture which comprises a methanotrophic bacterium to enzymatic hydrolysis. Hydrolysed products produced by this process form a further aspect of the invention.

The hydrolysate produced according to the invention may typically be used as a feedstuff or feedstuff component for fish or shellfish, e.g. as described in PCT/GB02/03795 (a copy of which is filed herewith) the contents of which are incorporated herein by reference. Likewise the hydrolysate may advantageously be used as a flavour-enhancer for pet food, especially for dog food, for example as described in British Patent Application No. 0203907.1 (a copy of which is filed herewith) the contents of which are also incorporated herein by reference.

The hydrolysate of the invention is especially preferably used as an ingredient for extruded fish food in pellet form. The fish food pellets will typically also contain protein and lipid, e.g. fish meal and fish and/or plant oil, as well as a small quantity of carbohydrate, e.g. plant-derived starch.

As used herein the term "palatability" includes all properties of a food product which may be sensed by a human or animal. Such properties include not only aroma, but also taste and texture. The term "palatability" is also considered to encompass other properties of a food product, e.g. digestibility. The term "palatability-enhancing agent" is considered to encompass materials which either possess desired palatability properties or which, when present in any food product, are effective to enhance the palatability (e.g. the flavour) of other components of the food.

In the process of the invention hydrolysis is effected in the presence of one or more enzymes capable of hydrolysing (e.g. hydrolytically degrading) the cell structure and/or intracellular components, preferably an enzyme or enzyme system capable of hydrolyzing the nucleic acid content of the cells. Suitable enzymes and enzyme systems capable of effecting hydrolysis may be readily determined by those skilled in the art. Preferably, these include nucleases which are capable of hydrolysing the DNA and/or RNA content (preferably the RNA content) of the biomass to produce the corresponding nucleotides, preferably 5'-nucleotides. An example of such an enzyme is Enzyme RP-1 (available from Amano Pharmaceutical Co., Ltd.). Enzyme RP-1 is a 5'-phosphodiesterase (E.C. No. 2.7.7.16, CAS No. 9001-99-4) preparation which is capable of hydrolysing RNA to nucleotides such as 5'-AMP, 5'-GMP, 5'-CMP and 5'-UMP.

Preferably, an enzyme having 5'-adenylic deaminase activity and which is thus capable of converting 5'-AMP to 5'-IMP may be used in combination (either simultaneously or, more preferably, separately, e.g. sequentially) with the nuclease(s). Such treatment has been found to increase the flavour-enhancing effects of the final hydrolysate. Deamizyme 50000 (Amano Pharmaceuticals Co., Ltd.) is one example of such an enzyme having strong 5'-adenylic deaminase activity. This is stable in the pH range 4.0-7.0 and has an optimum pH at about 5.6.

In one aspect of the invention, an enzyme or enzyme system which is capable of hydrolysing the nucleic acid content of the cells may be used in combination with at least one protease capable of effecting protein hydrolysis. This has the effect of increasing the 5'-nucleotide content of the final product and can also result in debittering of any bitter protein hydrolysates thereby enhancing taste development. Depending on the characteristics of each enzyme (i.e. optimum temperature, pH, etc.) these may be used simultaneously in treating the bacterial biomass. However, in general, treatment with the nuclease and protease enzymes/enzyme systems will be effected separately, e.g. sequentially. An example of a protease suitable for use in the method of the invention is Flavourzyme (available from Novo Nordisk A/S, Denmark). Flavourzyme is a fungal protease/peptidase complex containing both endo- and exoproteases and which is capable of hydrolysis of proteins under neutral or slightly acidic conditions. Other proteolytic enzymes which may be used in the method of the invention include Alcalase (available from Novo Nordisk, Denmark) and Promod 298L (Biocatalysts). However, these are generally less preferred than Flavourzyme since these have a degree of secondary activity as phosphatases which can serve to breakdown the 5'-nucleotides.

Suitable conditions under which hydrolysis may be effected and which thus yield a hydrolysed product will depend on the exact nature of the enzyme or enzyme system used and can be readily determined by those skilled in the art.

Temperature conditions will be such that hydrolysis is optimised without inactivating the enzymes and will depend on the enzyme or enzyme system selected for use in the process. Typically, the temperature for hydrolysis will be in the range of from 30 to 75° C., preferably from 40 to 70° C. If lower temperatures are employed (e.g. less than about 35° C.) hydrolysis proceeds very slowly. To prevent inactivation of the lytic enzymes, the temperature should preferably not exceed about 70° C. For breakdown of RNA to 5'-nucleotides, an optimal yield is obtained at about 65° C. when using the nuclease, Enzyme RP-1.

pH conditions for hydrolysis will similarly depend on the enzyme or enzyme system selected for use in the process. A suitable pH range for hydrolysis may lie in the range of from 4.0 to 7.0, preferably from 5.0 to 6.0. A preferred pH when using Enzyme RP-1 for hydrolysis of RNA is 5.5±0.25. The nature, quantity and timing of addition of any acid required to maintain the pH of the biomass within the desired limits during hydrolysis may be readily determined by those skilled in the art. Suitable acids for pH regulation include sulphuric acid, hydrochloric acid, etc.

The hydrolysed product may be produced in a continuous or batchwise process. Preferably this will be produced continuously.

The reaction time for treatment with any given enzyme or enzyme system will typically lie in the range of from 30 minutes to 24 hours. A preferred reaction time is about 1½-2 hours. Longer reaction times will generally lead to an increase in the degree of hydrolysis of the product and have been found to reduce any bitterness in the taste of the final hydrolysate.

The amount of any given enzyme required to produce a hydrolyzed product under any given conditions may be determined by those skilled in the art. Generally, this may be expected to be in the range of from 0.001 to 0.5%, e.g. from 0.03 to 0.25% (based on the weight of the biomass).

The hydrolysis process will generally be carried out in a stirred-tank reactor or plug-flow reactor.

The hydrolysis process herein described may be expected to yield a product which comprises from 70 to 95% by weight, e.g. about 75% by weight, insoluble material (e.g. comprising cell wall fragments, etc.) and from 5 to 30% by weight, e.g. about 10 to 20% by weight, soluble material (also referred to herein as the "soluble fraction") which typically will comprise both 5'- and 3'-nucleotides (mainly 5'-nucleotides, e.g. 5'-ribonucleotides). Especially preferred hydrolysis products produced when carrying out the process of the invention are those rich in natural ribonucleotides such as guanine 5'-monophosphate (5'-GMP) and inosine 5'-monophophate (5'-IMP).

In a preferred aspect of the invention the biomass may be pre-treated prior to enzyme hydrolysis in order to open up the cells (i.e. increase permeability of the cell membrane). This may be achieved in a number of ways. Preferably, pre-treatment may take the form of a heat-shock treatment in which the biomass is heated to a temperature of between 70 and 140° C., preferably 80 to 135° C., e.g. 85 to 90° C., for a period of from 30 seconds to 15 minutes, e.g. for about 2 minutes. Whilst not wishing to be bound by theory, this treatment is believed to increase the cell membrane permeability due to denaturation of the cell wall proteins thereby enabling a proportion of nucleic acids to leak from the cells into the suspending medium.

The bacterial biomass for use in the process of the invention may be formed by growth of the bacteria on a suitable medium or substrate. The exact nature of the growth medium used to produce the biomass is not critical to the performance of the invention and a variety of suitable substrates may be used.

Conveniently, the single-cell material for use in the process of the invention may be produced by a fermentation process in which oxygen and a suitable substrate such as a liquid or gaseous hydrocarbon, an alcohol or carbohydrate, e.g. methane, methanol or natural gas, together with a nutrient mineral solution are fed to a tubular reactor containing the microorganism or microorganisms. A number of such processes are known and described in the art, for example in WO 01/60974, DK-B-170824, EP-A-418187 and EP-A-306466. Particularly preferably the biomass which is hydrolysed according to the invention is produced as described in PCT/GB02/003798 (a copy of which is filed herewith) the contents of which are incorporated herein by reference.

Particularly preferred for use in the invention are single-cell protein materials derived from fermentation on hydrocarbon fractions or on natural gas. Especially preferred are single-cell proteins derived from the fermentation of natural gas. As the concentration of microorganisms increases within the fermentor, a portion of the reactor contents or broth is withdrawn and the microorganisms may be separated by techniques well known in the art, e.g. centrifugation and/or ultrafiltration. Conveniently, in such a fermentation process, the broth will be continuously withdrawn from the fermentor and will have a cell concentration between 1 and 5% by weight, e.g. about 3% by weight.

Single-cell materials produced from two or more microorganisms may be treated in accordance with the process of the invention. Although these may be produced in the same or separate fermentors, generally these will be produced in the same fermentor under identical fermentation conditions. Materials produced from separate fermentation processes may be blended together prior to hydrolysis in accordance with the process of the invention.

Preferred bacteria for use in the invention include *Methylococcus capsulatus* (Bath), a thermophilic bacterium originally isolated from the hot springs in Bath, England and deposited as NCIMB 11132 at The National Collections of Industrial and Marine Bacteria, Aberdeen, Scotland. *M. capsulatus* (Bath) has optimum growth at about 45° C., although growth can occur between 37° C. and 52° C. It is a gram-negative, non-motile spherical cell, usually occurring in pairs. The intracellular membranes are arranged as bundles of vesicular discs characteristic of Type I methanotrophs. *M. capsulatus* (Bath) is genetically a very stable organism without known plasmids. It can utilize methane or methanol for growth and ammonia, nitrate or molecular nitrogen as a source of nitrogen for protein synthesis.

One example of a fermentation process which uses natural gas as the sole carbon and energy source is that described in EP-A-306466 (Dansk Bioprotein). This process is based on the continuous fermentation of the methanotropic bacteria *M.*

*capsulatus* grown on methane. Air or pure oxygen is used for oxygenation and ammonia is used as the nitrogen source. In addition to these substrates, the bacterial culture will typically require water, phosphate (e.g. as phosphoric acid) and several minerals which may include magnesium, calcium, potassium, iron, copper, zinc, manganese, nickel, cobalt and molybdenum, typically used as sulphates, chlorides or nitrates. All minerals used in the production of the single-cell material should be of food-grade quality.

Natural gas mainly consists of methane, although its composition will vary for different gas fields. Typically, natural gas may be expected to contain about 90% methane, about 5% ethane, about 2% propane and some higher hydrocarbons. During the fermentation of natural gas, methane is oxidized by methanotrophic bacteria to biomass and carbon dioxide. Methanol, formaldehyde and formic acid are metabolic intermediates. Formaldehyde and to some extent carbon dioxide are assimilated into biomass. However, methanotrophic bacteria are unable to use substrates comprising carbon-carbon bonds for growth and the remaining components of natural gas, i.e. ethane, propane and to some extent higher hydrocarbons, are oxidized by methanotrophic bacteria to produce the corresponding carboxylic acids (e.g. ethane is oxidized to acetic acid). Such products can be inhibitory to methanotrophic bacteria and it is therefore important that their concentrations remain low, preferably below 50 mg/l, during the production of the biomass. One solution to this problem is the combined use of one or more heterotrophic bacteria which are able to utilize the metabolites produced by the methanotrophic bacteria. Such bacteria are also capable of utilizing organic material released to the fermentation broth by cell lysis. This is important in order to avoid foam formation and also serves to minimize the risk of the culture being contaminated with undesirable bacteria. A combination of methanotrophic and heterotrophic bacteria results in a stable and high yielding culture.

Suitable heterotrophic bacteria for use in the invention include DB3, strain NCIMB 13287 (*Ralstonia* sp. formerly known as *Alcaligenes acidovorans*), DB5, strain NCIMB 13289 (*Brevibacillus agri* formerly known as *Bacillus firmus*) and DB4, strain NCIMB 13288 (*Aneurinibacillus* sp. formerly known as *Bacillus brevis*) which each have optimum growth at a temperature of about 45° C.

DB3 is a gram-negative, aerobic, motile rod belonging to the genus *Ralstonia* which can use ethanol, acetate, propionate and butyrate for growth. DB4 is a gram-positive, endospore-forming, aerobic rod belonging to the genus *Aneurinibacillus* which can utilize acetate, D-fructose, D-mannose, ribose and D-tagatose. DB5 is a gram-positive, endospore-forming, motile, aerobic rod of the genus *Brevibacillus* which can utilize acetate, N-acetyl-glucosamine, citrate, gluconate, D-glucose, glycerol and mannitol.

Particularly preferably, the single-cell protein material for use in the invention will be a microbial culture which consists of methanotrophic bacteria optionally in combination with one or more species of heterotrophic bacteria, especially preferably a combination of methanotrophic and heterotrophic bacteria. As used herein, the term "methanotrophic" encompasses any bacterium which utilizes methane, methanol or formaldehyde for growth. The term "heterotrophic" is used for bacteria that utilize organic substrates other than methane, methanol or formaldehyde for growth.

Especially preferred for use in the invention is a microbial culture comprising a combination of the methanotrophic bacterium *Methylococcus capsulatus* (Bath) (strain NCIMB 11132), and the heterotrophic bacteria DB3 (strain NCIMB 13287) and DB5 (strain NCIMB 13289), optionally in combination with DB4 (strain NCIMB 13288). The role of DB3 is to utilize acetate and propionate produced by *M. capsulatus* (Bath) from ethane and propane in the natural gas. DB3 may account for up to 10%, e.g. about 6 to 8%, of the total cell count of the resulting biomass. The role of DB4 and DB5 is to utilize lysis products and metabolites in the medium. Typically, DB4 and DB5 will each account for less than 1% of the cell count during continuous fermentation.

During production of the single-cell material, the pH of the fermentation mixture will generally be regulated to between about 6 and 7, e.g. to 6.5±0.3. Suitable acids/bases for pH regulation may be readily selected by those skilled in the art. Particularly suitable for use in this regard are sodium hydroxide and sulphuric acid. During fermentation the temperature within the fermentor should preferably be maintained to within the range of from 40° C. to 50° C., most preferably 45° C.±2° C.

Suitable fermentors for use in preparing the single-cell material are those of the loop-type, such as those described in DK 1404/92, EP-A-418187 and EP-A-306466 of Dansk Bioprotein, or air-lift reactors. A loop-type fermentor having static mixers results in a high utilization of the gases (e.g. up to 95%) due to the plug-flow characteristics of the fermentor. Gases are introduced at several positions along the loop and remain in contact with the liquid until they are separated in the headspace of the reactor. Continuous fermentation may be achieved using 2-3% biomass (on a dry weight basis) and a dilution rate of 0.02 to 0.50 $h^{-1}$, e.g. 0.05-0.25 $h^{-1}$.

Other fermentors may be used in preparing the single-cell material and these include tubular and stirred tank fermentors.

Ideally, the biomass produced from fermentation of natural gas will comprise from 60 to 80% by weight crude protein; from 5 to 20% by weight crude fat; from 3 to 10% by weight ash; from 3 to 15% by weight nucleic acids (RNA and DNA); from 10 to 30 g/kg phosphorus; up to 350 mg/kg iron; and up to 120 mg/kg copper. Particularly preferably, the biomass will comprise from 68 to 73%, e.g. about 70% by weight crude protein; from 9 to 11%, e.g. about 10% by weight crude fat; from 5 to 10%, e.g. about 7% by weight ash; from 8 to 12%, e.g. about 10% by weight nucleic acids (RNA and DNA); from 10 to 25 g/kg phosphorus; up to 310 mg/kg iron; and up to 110 mg/kg copper. The amino acid profile of the protein content should be nutritionally favourable with a high proportion of the more important amino acids cysteine, methionine, threonine, lysine, tryptophan and arginine. Typically these may be present in amounts of about 0.7%, 3.1%, 5.2%, 7.2%, 2.5% and 6.9%, respectively (expressed as a percent of the total amount of amino acids). Generally the fatty acids will comprise mainly the saturated palmitic acid (approx. 50%) and the monounsaturated palmitoleic acid (approx. 36%). The mineral content of the product will typically comprise high amounts of phosphorus (about 1.5% by weight), potassium (about 0.8% by weight) and magnesium (about 0.2% by weight).

Typically, the resulting biomass will be produced in the form of a flowable aqueous paste or slurry. Generally this will consist essentially of whole cell material, although a proportion of ruptured cell material may also be present.

Following production of the biomass, this is generally concentrated from the fermentation medium, for example by conventional centrifugation and/or filtration methods, e.g. ultrafiltration. Concentration of the biomass may be effected by centrifugation alone. During centrifugation the dry matter content of the biomass is typically increased to about 5 to 18% by weight, preferably 8 to 15%, e.g. about 14% by weight. If necessary, or indeed desirable, filtration (e.g. ultrafiltration)

methods may be used to further increase the solids content of the biomass. Ultrafiltration, which may be effected at a temperature of between 40 and 50° C., e.g. between 42 and 46° C., further concentrates the biomass to a product containing from 10 to 30%, preferably from 15 to 25%, e.g. from 18 to 22% by weight single-cell material. The size exclusion used during ultrafiltration will generally be in the range of about 20,000 Daltons. The resulting biomass will be in the form of an aqueous slurry and will typically have a solids content in the range of from 10 to 30%, preferably 15 to 25%, e.g. about 20% by weight.

Prior to hydrolysis the biomass will preferably be subjected to heat treatment and/or a pressure drop in order that the microbial cell walls are at least partially broken thereby releasing a portion of nucleic acids from within the cell structure.

In a preferred aspect the invention provides a process for the production of a palatability-enhancing material (e.g. a flavour-enhancing agent), said process comprising the following steps:

(a) preparing an aqueous slurry of a microbial culture comprising a methanotrophic bacterium optionally in combination with one or more heterotrophic bacteria;

(b) optionally heating the slurry, preferably to a temperature of from 70 to 140° C., more preferably 80 to 135° C., e.g. 85 to 90° C., for a period of from 30 seconds to 15 minutes, e.g. for about 2 minutes; and (c) subjecting the resulting product to enzymatic hydrolysis.

Following hydrolysis the product is preferably heated, typically to a temperature in the range from 50 to 75° C., preferably 55 to 65° C., e.g. about 60° C., for about 5 minutes in order to inactivate the lytic enzymes.

The hydrolysate comprises a mixture of soluble and insoluble cellular material. Whilst this may be used directly (i.e. without further processing) as a component or precursor in food products (e.g. as a palatability-enhancing flavouring component), it is preferable to separate the insoluble cellular material from the soluble fraction. This may be effected by separation processes known in the art, preferably by filtration, e.g. ultrafiltration. Ultrafiltration, which may be effected at a temperature of between 35 and 75° C., e.g. between 50 and 70° C., is effective to filter out nucleotides and other small molecules which are able to cross the filter membrane. It is this soluble fraction or permeate which will mainly be used in the production of food products, e.g. as a palatability enhancing agent. The size exclusion used during ultrafiltration will determine the particulate content of the permeate and can therefore be selected depending on the desired properties of the product. Typically, this will be in the range of about 20 kD. However, filters having a MW cut-off in the range of from 10 to 100 kD may be used. To improve the yield of product (and thus 5'-nucleotides), the hydrolysate may be washed repeatedly (e.g. up to 5 times, e.g. up to 3 times) with water followed by additional ultrafiltration steps.

Following separation of the hydrolysate the solids content of the soluble fraction may be expected to be in the range of from 1 to 3.5% by weight, e.g. from 2.0 to 2.1% by weight. The content of 5'-nucleotides (on a dry matter basis) may be expected to be in the range of about 4 to 15% by weight.

If desired, further reduction in the water content of the product can be achieved by evaporation methods known in the art. For example, this may be used to produce a product having a solids content in the range of from 15 to 70% by weight, e.g. about 35% by weight. Suitable evaporation methods include falling-raising film evaporation, falling film evaporation and flash evaporation. If necessary, the step of evaporation may be repeated several times, for example three times. In the event of foaming problems during evaporation, an anti-foaming agent such as Kirnol V39360 (available from Grünau Illertissen GmbH, Germany) may be added. The amount of foaming agent required to prevent foaming may be readily determined by those skilled in the art. Appropriate amounts of foaming agent may lie in the range of from 0.01 to 0.05%, e.g. about 0.02% by weight.

Immediately following evaporation the product is preferably cooled, for example to a temperature in the range of from 5 to 20° C., e.g. to a temperature of about 15° C.

Typically, the product will be further processed in accordance with spray drying techniques well known in the art. Any conventional spray drier with or without fluid bed units may be used, for example the Type 3-SPD spray drier available from APV Anhydro, Denmark. Preferably the inlet temperature for the air in the spray drier may be about 250° C. and the outlet temperature may be about 90° C. Preferably the resulting product will have a water content of from about 1 to 10% by weight, e.g. from 2 to 7% by weight.

The resulting product is very hygroscopic and should therefore be stored in a moisture free environment (e.g. in dry bags) at low temperatures.

As a result of the hydrolysis process herein described the products produced in accordance with the invention are rich in nucleotides, especially 5'-nucleotides, e.g. 5'-GMP and 5'-IMP, and have a high MSG content. Such products are generally pale to yellow in colour, neutral in taste and highly soluble in water (e.g. totally soluble to produce a 1% solution in warm water). These are especially useful as a component or precursor in food products, particularly when used as a palatability enhancer or flavouring agent, e.g. to improve the flavour of human or animal foods (e.g. animal feeds).

Viewed from a further aspect the invention provides a hydrolysed product derived from a methanotrophic bacterium-containing biomass, said product having a nucleotide content in the range of from 10 to 20%, e.g. from 12 to 15% by weight (on a dry matter basis). A preferred product in accordance with the invention is that having a 5'-nucleotide content in the range of from 4 to 15%, e.g. from 10 to 14% by weight (on a dry matter basis). Preferably, such products will have an MSG content in the range of up to 3% by weight, e.g. from 1-2% by weight, a protein content of less than 70, e.g. less than 60% by weight and a carbohydrate content of less than 20, e.g. less than 12% by weight.

Viewed from a yet further aspect the invention provides the use of a hydrolysed material or processed derivative thereof as herein described as, in or as a precursor for a foodstuff, preferably as a palatability enhancer, e.g. as a flavour component.

Viewed from a yet still further aspect the invention provides a food product comprising a hydrolysed material or processed derivative thereof as herein described.

When used as a palatability enhancer in food products, the hydrolysed material, or processed hydrolysed material, will be used in an amount effective for its flavour and/or smell to be observed by the consumer. Especially preferably, this will be employed in an amount effective to improve the palatability of the food. Typically, this may be used in an amount of from 0.1 to 1.0% by weight, preferably up to 0.5% by weight. The exact proportion will depend on several factors, not least the nature of the food to which the product is to be added, the manner of application or inclusion etc. Appropriate levels may readily be determined by those skilled in the art.

The hydrolysed product herein described may be used as a substitute for traditional yeast derivatives. Foods to which the product may be added include both human and animal foods.

For example, this may be incorporated into food products for human consumption such as soups, gravies, dressings, meat products such as meatballs, emulsions such as mayonnaise, etc.

A by-product of the process herein described is the retentate (i.e. the insoluble fraction) produced following separation of the hydrolysed material. This product generally comprises components such as protein, fat, and carbohydrates and therefore has a high nutritional value. For example, this product may have the following characteristics:

Water content (determined according to M101 [1]): 1-10 wt. %, e.g. about 5 wt. %;
1: the water in the sample is evaporated at 105° C. overnight. The water content is determined by weighing before and after drying.

Ash content (determined according to EU Commission Directive No. 162/67/EØF): 3-12 wt. %, e.g. about 5 wt. %;

Crude fat (determined according to EU Commission Directive No. 93/28/EØF): 5-15 wt. %, e.g. about 9 wt. %;

Crude protein (determined according to EU Commission Directive No. 72/199/EØ): 60-80 wt. %, e.g. about 69 wt. %;

RNA (determined according to M105 [2]): 2-10 wt. %, e.g. about 5 wt. %;

DNA (determined according to M105 [2]): 1-7 wt. %, e.g. about 2 wt. %;
2: see Herbert et al., Chemical Analysis of Microbial cells, Methods Microbiol. 5B: 285-328, 1971.

Total amino acids content (determined according to M295 [3]): 62-65 wt. %;
3: see Waters AccQ.Tag Chemistry Package. Instruction Manual 052874TP, Rev. 1, and Wandelen et al., Journal of Chromatography A, 763, 11-22.

Total carbohydrate (determined according to M140 [4]): up to 15% wt, e.g. 1 to 13% wt, typically about 10% wt; and
4: see Herbert et al., Chemical Analysis of Microbial cells, Methods Microbiol. 5B: 267-269, 1971.

In vitro digestibility (determined according to M150 [5]): 65-85% of N, e.g. about 75% of N.
5: see Boisen, CAB International, p. 135-145, 1991.

This by-product may be used in food products, in particular as a nutritional additive to animal feeds. This product and its use in food products form further aspects of the invention.

The invention will now be described in more detail in the following non-limiting Examples, with reference to accompanying FIG. 1 which schematically illustrates apparatus for use in carrying out a process in accordance with the invention.

EXAMPLE 1

Preparation of Biomass

A microbial culture comprising *Methylococcus capsulatus* (Bath) (strain NCIMB 11132), DB3 (strain NCIMB 13287) and DB5 (strain NCIMB 13289), is produced in a loop-type fermentor by continuous aerobic fermentation of natural gas in an ammonium/mineral salts medium (AMS) at 45° C., pH 6.5. The AMS medium contains the following per liter: 10 mg $NH_3$, 75 mg $H_3PO_4.2H_2O$, 380 mg $MgSO_4.7H_2O$, 100 mg $CaCl_2.2H_2O$, 200 mg $K_2SO_4$, 75 mg $FeSO_4.7H_2O$, 1.0 mg $CuSO_4.5H_2O$, 0.96 mg $ZnSO_4.7H_2O$, 120 µg $CoCl_2.6H_2O$, 48 µg $MnCl_2.4H_2O$, 36 µg $H_3BO_3$, 24 µg $NiCl_2.6H_2O$ and 1.20 µg $NaMoO_4.2H_2O$.

The fermentor is filled with water which has been heat-treated at 125° C. for 10 secs. Addition of the different nutrients is regulated according to their consumption. With gradual build-up over time, continuous fermentation is operated with 1-3% biomass (on a dry weight basis).

The biomass is subjected to centrifugation in an industrial continuous centrifuge at 3,000 rpm to produce a product which contains about 12% by weight biomass.

EXAMPLE 2

Preparation of Hydrolysate

Method
A hydrolysate is prepared in accordance with the following method:
1. 2 L biomass produced in accordance with Example 1 (ca. 14 g/L) is centrifuged down and resuspended to about 250 mL in the supernatant.
2. The biomass is warmed to 80-95° C. for 15 min.
3. Cool to 65° C.
4. Set pH to 5.50
5. 56 mg Nuclease RP-1 added.
6. 2 hours incubation.
7. Drop temperature to 50° C.
8. Add 36 mg Deamizyme 50000.
9. 1 hour incubation.
10. Heat to 85° C. for 5 minutes.
11. Cool to 40-50° C.
12. UF filter (minimum 50 mL product).
13. The product is analysed for dry matter content and then freeze dried.
14. The freeze dried product is analysed for 5'-GMP, 5'-IMP, N, ash, fat and carbohydrate (the anthron method) content.

Results
The resulting product was analysed and found to have the following characteristics:

| | | |
|---|---|---|
| Chemical Composition (in g per 100 g product) | Dry matter | 94.0-98.0 |
| | 5'-GMP (HPLC) | 5.0-7.5 |
| | 5'-IMP (HPLC) | 5.0-7.5 |
| | MSG (enzymatic) | 1.0-3.5 |
| | Sodium Chloride | 0.0 |
| | Total nitrogen (EA) | 8.0-11.0 |
| | Protein & nucleotides (Nx6.25) | 50-63 |
| | Total Carbohydrates (Anthrone) | 10-20 |
| | Ash (550') | 10-15 |
| | Fat (EC, 84/4/EEC) | <0.1 |
| Physical Characteristics | Solubility | 10% in water |
| | pH (10% solution) | 5.0-5.5 |
| | Colour (10% solution) | Brown |
| | Colour of product | Beige |

EXAMPLE 3

Preparation of Hydrolysate

Method
A hydrolysate is prepared in accordance with the following method:
1. 2 L biomass produced in accordance with Example 1 (ca. 14 g/L) is centrifuged down and resuspended to about 250 mL in the supernatant.
2. The biomass is warmed to 80-95° C. for 15 min.
3. Cool to 65° C.
4. Set pH to 5.50

5. 56 mg Nuclease RP-1 added.
6. 2 hours incubation.
7. Drop temperature to 50° C.
8. 40 mg Deamizyme 50000 and 252 mg Flavourzyme are added.
9. 16 hours incubation.
10. Heat to 85° C. for 5 minutes.
11. Cool to 40-50° C.
12. UF filter (minimum 50 mL product).
13. The product is analysed for dry matter content and then freeze dried.
14. The freeze dried product is analysed for 5'-GMP, 5'-IMP, N, OPA, ash, fat, carbohydrate (the anthron method), and amino acid composition.

Results

The resulting product was analysed and found to have the following characteristics:

| Chemical Composition (in g per 100 g product) | Dry matter | 94.0-98.0 | | |
|---|---|---|---|---|
| | 5'-GMP (HPLC) | 2.5-3.5 | | |
| | 5'-IMP (HPLC) | 2.5-3.5 | | |
| | MSG (enzymatic) | 2.0-3.0 | | |
| | Sodium Chloride | 0.0 | | |
| | Amino nitrogen (OPA) | 4.0-5.0 | | |
| | Total nitrogen (EA) | 10.0-12.0 | | |
| | Protein & nucleotides (Nx6.25) | 63-75 | | |
| | Total Carbohydrates (Anthrone) | 8-14 | | |
| | Ash (550') | 5-10 | | |
| | Fat (EC, 84/4/EEC) | <0.1 | | |
| Amino acid Composition in g per 100 g product) | Alanine | 5.4 | Arginine | 4.1 |
| | Aspartic Acid | 5.9 | Cysteine | 0.5 |
| | Glutamic acid | 7.4 | Glycine | 3.5 |
| | Histidine | 1.3 | Isoleucine | 2.8 |
| | Leucine | 4.9 | Lysine | 4.9 |
| | Methionine | 1.9 | Phenylalanine | 2.9 |
| | Proline | 3.3 | Serine | 2.3 |
| | Threonine | 2.8 | Tyrosine | 2.4 |
| | Tryptophan | 1.1 | Valine | 5.7 |
| Physical Characteristics | Solubility | 10% in water | | |
| | pH (10% solution) | 5.0-5.5 | | |
| | Colour (10% solution) | Yellow | | |
| | Colour of product | Light beige | | |

The invention claimed is:

1. A hydrolysed product suitable for use as a palatability enhancing agent obtainable by a process comprising subjecting a microbial culture which comprises a methanotrophic bacterium and a heterotrophic bacterium, to enzymatic hydrolysis, wherein enzymatic hydrolysis is effected by adding to said culture a nuclease which hydrolyses the DNA and/or RNA content of the culture to produce the corresponding 5'-nucleotides, and separating a soluble fraction comprising the hydrolysed product from the microbial culture, wherein said product comprises from 4 to 15% dry weight of 5'-nucleotides, wherein said culture is subjected to cell lysis before said enzymatic hydrolysis.

2. A food product comprising a hydrolysed material or processed derivative thereof as claimed in claim 1.

3. The food product as claimed in claim 2, wherein said food product is a dog food or an additive.

4. The food product as claimed in claim 2, wherein said food product is a fish food.

5. The food product as claimed in claim 4, wherein said food product is an extruded fish food in pellet form.

6. The hydrolysed product as claimed in claim 1, wherein said culture has been produced using methane as the carbon source.

7. The hydrolysed product as claimed in claim 1, wherein cell lysis is effected by pressure reduction.

8. The hydrolysed product as claimed in claim 1, wherein enzymatic hydrolysis is effected by additionally contacting said culture with an enzyme having 5'-adenylic deaminase activity.

9. The hydrolysed product as claimed in claim 1, wherein enzymatic hydrolysis is effected by additionally contacting said culture with a protease.

10. The hydrolysed product as claimed in claim 1, wherein said culture comprises *Methylococcus capsulatus*.

11. The hydrolysed product as claimed in claim 1, wherein said microbial culture is in the form of an aqueous slurry, and wherein the aqueous slurry is optionally heated.

12. A hydrolysed product suitable for use as a palatability enhancing agent obtainable by a process consisting essentially of subjecting a microbial culture which comprises a methanotrophic bacterium and a heterotrophic bacterium, to enzymatic hydrolysis, wherein enzymatic hydrolysis is effected by adding to said culture a nuclease which hydrolyses the DNA and/or RNA content of the culture to produce the corresponding 5'-nucleotides, and separating a soluble fraction comprising the hydrolysed product from the microbial culture, wherein said product comprises from 4 to 15% dry weight of 5'-nucleotides, wherein said culture is subjected to cell lysis before said enzymatic hydrolysis.

13. A process for producing a feedstuff or feedstuff component, comprising subjecting a microbial culture which comprises a methanotrophic bacterium and a heterotrophic bacterium, to enzymatic hydrolysis, wherein enzymatic hydrolysis is effected by adding to said culture a nuclease which hydrolyzes the DNA and/or RNA content of the culture to produce the corresponding 5'-nucleotides, and separating the hydrolysed product from the microbial culture, wherein said product comprises from 4 to 15% dry weight of 5'-nucleotides.

14. A process as claimed in claim 13, wherein said culture has been produced using methane as the carbon source.

15. The process as claimed in claim 13, wherein cell lysis is effected by pressure.

16. The process as claimed in claim 13, wherein enzymatic hydrolysis is effected by additionally contacting said culture with an enzyme having 5'-adenylic deaminase activity.

17. The process as claimed in claim 13, wherein enzymatic hydrolysis is effected by additionally contacting said culture with a protease.

18. The process as claimed in claim 13, wherein said culture comprises *Methylococcus capsulatus*.

19. The process as claimed in claim 13, wherein said microbial culture is in the form of an aqueous slurry, and wherein the aqueous slurry is optionally heated.

* * * * *